(12) United States Patent
Rademacher et al.

(10) Patent No.: US 11,654,625 B2
(45) Date of Patent: May 23, 2023

(54) APPARATUSES FOR ADDITIVELY MANUFACTURING THREE-DIMENSIONAL OBJECTS

(71) Applicant: Carbon, Inc., Redwood City, CA (US)

(72) Inventors: Soren Rademacher, Chapel Hill, NC (US); David Shirvanyants, Chapel Hill, NC (US); Alexander Ermoshkin, Pittsboro, NC (US); Derek Alan Faust, Durham, NC (US)

(73) Assignee: Carbon, Inc., Redwood City, CA (US)

( * ) Notice: Subject to any disclaimer, the term of this patent is extended or adjusted under 35 U.S.C. 154(b) by 13 days.

(21) Appl. No.: 17/519,652

(22) Filed: Nov. 5, 2021

(65) Prior Publication Data

US 2022/0055301 A1    Feb. 24, 2022

Related U.S. Application Data

(63) Continuation of application No. 17/284,513, filed as application No. PCT/US2019/058739 on Oct. 30, 2019, now Pat. No. 11,192,302.
(Continued)

(51) Int. Cl.
*B29C 64/218*     (2017.01)
*B33Y 30/00*      (2015.01)
(Continued)

(52) U.S. Cl.
CPC .......... *B29C 64/218* (2017.08); *B29C 64/214* (2017.08); *B29C 64/232* (2017.08);
(Continued)

(58) Field of Classification Search
CPC ... B29C 64/205; B29C 64/214; B29C 64/218; B29C 64/321; B29C 64/343
See application file for complete search history.

(56) References Cited

U.S. PATENT DOCUMENTS

| 4,961,901 A | 10/1990 | Wuellenweber et al. |
| 5,474,719 A | 12/1995 | Fan et al. |

(Continued)

FOREIGN PATENT DOCUMENTS

| JP | S63312130 A | 12/1988 |
| JP | 2017007321 A | 1/2017 |

(Continued)

OTHER PUBLICATIONS

International Search Report and Written Opinion corresponding to PCT/US2019/058739; dated Feb. 3, 2020 (14 pages).

(Continued)

*Primary Examiner* — Timothy Kennedy
(74) *Attorney, Agent, or Firm* — Myers Bigel, P.A.

(57) ABSTRACT

The present disclosure describes an apparatus for additively manufacturing a three-dimensional object. The apparatus includes a radiation source, a carrier on which the three-dimensional object is made, an applicator assembly configured to apply a polymerizable liquid, and a frame, with the applicator assembly and the radiation source connected to the frame. A first drive assembly interconnects the applicator assembly and the frame and a second drive assembly interconnects the carrier and the frame. The frame defines a build region between the applicator assembly and the carrier. The applicator assembly includes a polymerizable liquid supply chamber, an application roller, and a metering roller. The applicator assembly may optionally include a post-metering roller. An apparatus comprising a first and a second applicator assembly and a smaller scale version of the apparatus are also described.

20 Claims, 10 Drawing Sheets

Related U.S. Application Data

(60) Provisional application No. 62/753,143, filed on Oct. 31, 2018.

(51) Int. Cl.
- B33Y 40/00 (2020.01)
- B29C 64/214 (2017.01)
- B29C 64/321 (2017.01)
- B29C 64/232 (2017.01)
- B29C 64/343 (2017.01)
- B29C 64/35 (2017.01)

(52) U.S. Cl.
CPC .......... *B29C 64/321* (2017.08); *B29C 64/343* (2017.08); *B29C 64/35* (2017.08); *B33Y 30/00* (2014.12); *B33Y 40/00* (2014.12)

(56) References Cited

U.S. PATENT DOCUMENTS

| | | |
|---|---|---|
| 5,902,537 A | 5/1999 | Almquist et al. |
| 5,922,364 A | 7/1999 | Young |
| 6,174,156 B1 | 1/2001 | Chapman et al. |
| 6,656,410 B2 | 12/2003 | Hull et al. |
| 6,764,636 B1 | 7/2004 | Allanic et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,440,285 B2 | 9/2016 | Teulet |
| 9,453,142 B2 | 9/2016 | Rolland et al. |
| 9,598,606 B2 | 3/2017 | Rolland et al. |
| 9,676,963 B2 | 6/2017 | Rolland et al. |
| 10,207,326 B2 | 2/2019 | Park et al. |
| 10,259,171 B2 | 4/2019 | Robeson et al. |
| 10,343,390 B2 | 7/2019 | Knecht et al. |
| 10,434,706 B2 | 10/2019 | Robeson et al. |
| 2001/0050448 A1 | 12/2001 | Kubo et al. |
| 2005/0104241 A1 | 5/2005 | Kritchman et al. |
| 2007/0006765 A1 | 1/2007 | Fenzi |
| 2013/0337100 A1 | 12/2013 | Costabeber |
| 2014/0363585 A1 | 12/2014 | Pialot et al. |
| 2015/0258706 A1 | 9/2015 | Okamoto et al. |
| 2015/0258733 A1 | 9/2015 | Okamoto et al. |
| 2016/0221261 A1 | 8/2016 | Yamamoto et al. |
| 2017/0028638 A1 | 2/2017 | Evans et al. |
| 2017/0066185 A1 | 3/2017 | Ermoshkin et al. |
| 2017/0136688 A1 | 5/2017 | Knecht et al. |
| 2017/0239932 A1 | 8/2017 | Knecht et al. |
| 2018/0186073 A1 | 7/2018 | Dial et al. |
| 2018/0215079 A1 | 8/2018 | Hakkaku et al. |
| 2018/0333911 A1 | 11/2018 | Lin et al. |
| 2018/0339454 A1 | 11/2018 | Franklin et al. |
| 2019/0060998 A1 | 2/2019 | Kelkar et al. |
| 2019/0091921 A1 | 3/2019 | Paternoster et al. |
| 2019/0160733 A1 | 5/2019 | Mirkin et al. |
| 2019/0193150 A1 | 6/2019 | Hudelson et al. |
| 2019/0232559 A1 | 8/2019 | Thompson |
| 2019/0366433 A1 | 12/2019 | Aydin et al. |
| 2020/0101664 A1 | 4/2020 | Prakash et al. |
| 2021/0154889 A1 | 5/2021 | Fetfatsidis |

FOREIGN PATENT DOCUMENTS

| | | |
|---|---|---|
| WO | 2015164234 A1 | 10/2015 |
| WO | 2017210298 A1 | 12/2017 |

OTHER PUBLICATIONS

Tumbleston, John R., et al., "Continuous liquid interface production of 3D Objects", Science, 347(6228), 2015, 1349-1352.

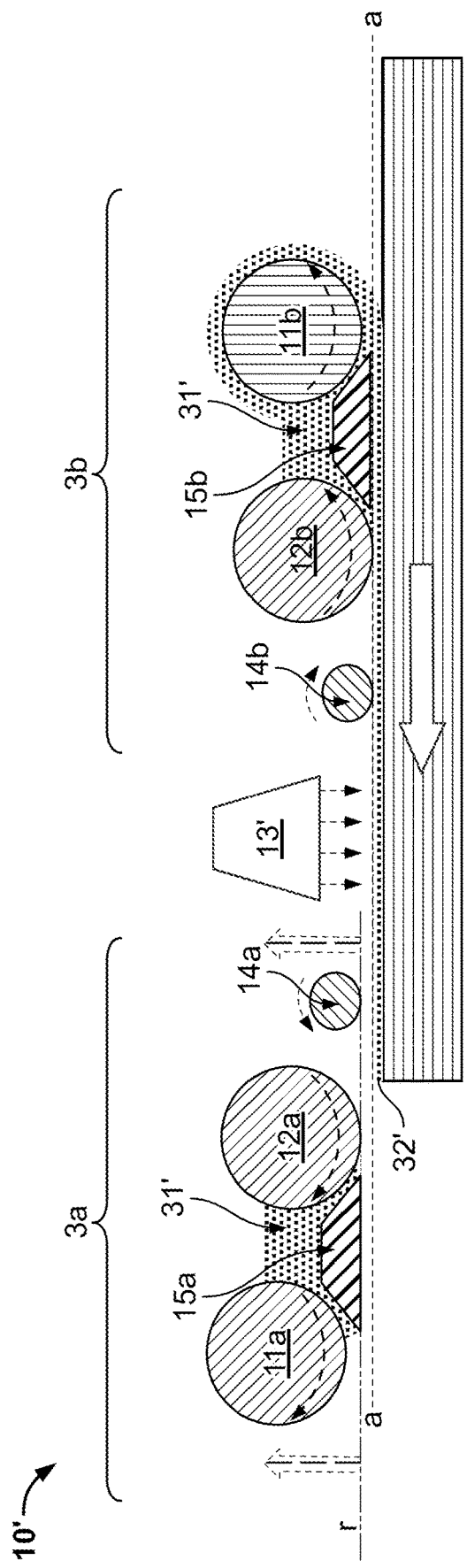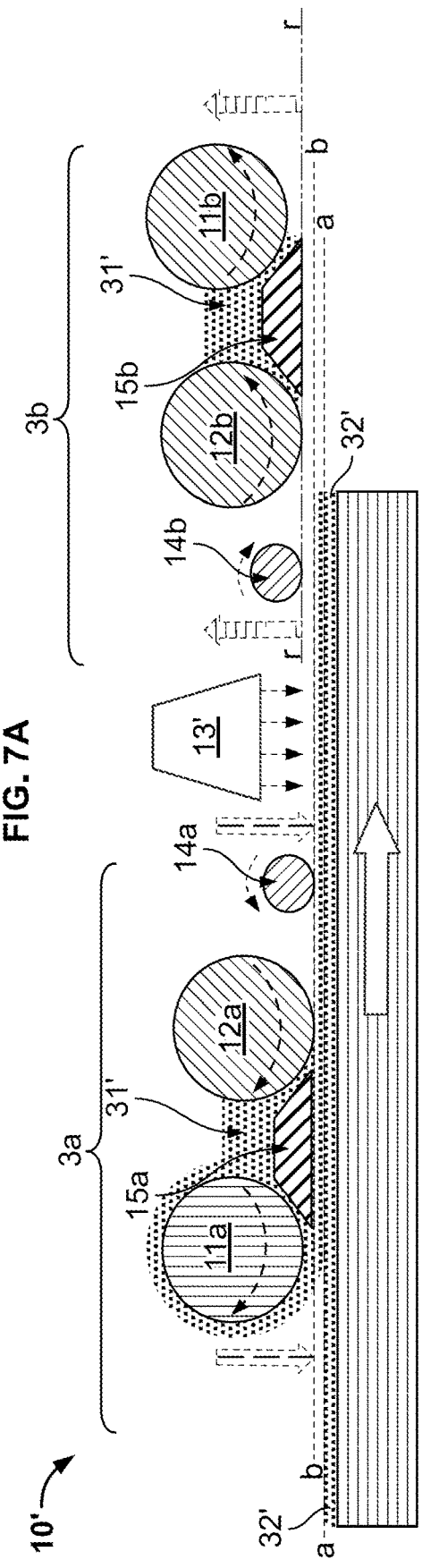
FIG. 7A
FIG. 7B

APPARATUSES FOR ADDITIVELY MANUFACTURING THREE-DIMENSIONAL OBJECTS

STATEMENT OF PRIORITY

The present application is a continuation of U.S. patent application Ser. No. 17/284,513, filed Apr. 12, 2021, which is a 35 U.S.C. § 371 national phase application of International Application Serial No. PCT/US2019/058739, filed Oct. 30, 2019, which claims priority from and the benefit of U.S. Provisional Application Ser. No. 62/753,143, filed Oct. 31, 2018, the disclosures of which are hereby incorporated herein in their entireties.

FIELD OF THE INVENTION

The present invention concerns additive manufacturing, and more particularly, apparatuses useful for additively manufacturing three-dimensional objects.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also, e.g., in J. Tumbleston, D. Shirvanyants, N. Ermoshkin et al., Continuous liquid interface production of 3D Objects, *Science* 347, 1349-1352 (published online 16 Mar. 2015); see also, e.g., Rolland et al., U.S. Pat. Nos. 9,676,963, 9,453,142 and 9,598,606 and Knecht and Littrell, U.S. Patent Application Publication No. 2017/0136688).

Techniques such as CLIP harness inhibitors of polymerization such as oxygen to the benefit of the stereolithography process. However, the inhibitors can be consumed, and when consumed must be re-supplied, particularly when the process is operated rapidly. Thus, there is a need to develop alternative techniques of stereolithography, such as, for example, free liquid interface printing (FLIP) (see, e.g., U.S. Patent Application Publication No. 2017/0066185 to Ermoshkin et al., which is incorporated herein by reference in its entirety; see also, e.g., U.S. Pat. No. 10,343,390 and U.S. Patent Application Publication No. 2017/0239932 to Knecht et al.).

L. Robeson et al., International Publication No. WO2015/164234 (see also U.S. Pat. Nos. 10,259,171 and 10,434,706) describes the use of stationary and mobile (circulating) immiscible liquids as windows for bottom-up stereolithography. Robeson et al. particularly suggests the use of circulating pools for the purposes of cooling the pool and refreshing the oxygen content of fluorinated fluid pools. Similar technology has subsequently been described by C. Mirkin et al., International Publication No. WO2017/210298 (see also U.S. Patent Application Publication No. 2019/0160733). However, the use of liquid pools as windows for bottom-up stereolithography presents both engineering challenges and practical limitations. Accordingly, there is a need for new approaches to additive manufacturing that do not require liquid pools.

SUMMARY OF THE INVENTION

Embodiments of the present invention advantageously eliminate the need for an oxygen-permeable film, such as, for example, as described in U.S. Patent Application Publication No. 2017/0066185 to Ermoshkin et al.

In some embodiments, an apparatus for additively manufacturing a three-dimensional object includes a radiation source, a carrier on which the three-dimensional object is made, and an applicator assembly configured to apply a polymerizable liquid. The applicator assembly includes a polymerizable liquid supply chamber, an application roller, and a metering roller. The apparatus may further include a frame that defines a build region between the applicator assembly and the carrier. The applicator assembly and the radiation source may be connected to the frame. A first drive assembly interconnects the applicator assembly and the frame and a second drive assembly interconnects the carrier and the frame.

In some embodiments, the applicator assembly further includes a post-metering roller.

In some embodiments, the applicator assembly further includes a metering element between the application roller and the metering roller.

In some embodiments, the metering element is a center bar between the application roller and the metering roller.

In some embodiments, the metering element is a cleaning blade.

In some embodiments, the application roller and the metering roller both rotate in a counter-clockwise direction.

In some embodiments, the application roller rotates in a clockwise direction and the metering roller rotates in a counter-clockwise direction.

In some embodiments, the post-metering roller rotates in a clockwise direction.

In some embodiments, the metering roller rotates such that its tangential velocity is in an opposite direction of the motion of the carrier.

In some embodiments, the radiation source includes a light source.

In some embodiments, the applicator assembly further includes a first blade pressed against the metering roller.

In some embodiments, the applicator assembly further includes a second blade on top of the post-metering roller.

In some embodiments, the apparatus applies and cures a coating of polymerizable liquid at a rate in the range of 50 inches/minute to about 600 inches/minute.

In some embodiments, an apparatus for additively manufacturing a three-dimensional object includes a first and a second applicator assembly.

In some embodiments, the apparatus further includes a plurality of air cylinders configured to raise and lower each of the first and second applicator assemblies such that when one applicator assembly is lowered to apply the polymerizable liquid (i.e., active), the other applicator assembly is raised (i.e., inactive).

In some embodiments, an apparatus for additively manufacturing a three-dimensional object includes a radiation source, a carrier on which the three-dimensional object is made, an applicator assembly, a frame and a first and second drive assembly. The applicator assembly may be configured to apply a polymerizable liquid. The applicator assembly includes a polymerizable liquid supply chamber, an application roller, a metering roller, and two metering elements. One metering element is located between the supply chamber and the application roller and the other metering element is located between the application roller and the metering roller. The applicator assembly and the radiation source are connected to the frame with the frame defining a build region between the applicator assembly and the carrier. The first drive assembly interconnects the applicator assembly and the frame and the second drive assembly interconnects the carrier and the frame.

In some embodiments, the application roller is configured to rotate both in a clockwise direction and counter-clockwise direction.

In some embodiments, the polymerizable liquid is a dental resin.

In some embodiments, the three-dimensional object is a dental prosthetic.

In some embodiments, the dental prosthetic is a dental implant, a dental bridge, or a dental crown.

Non-limiting examples and specific embodiments of the present invention are explained in greater detail below in the drawings herein and the specification set forth below. The disclosures of all references cited herein are to be incorporated herein by reference in their entirety.

Among other things, the present invention advantageously replaces the liquid pool of Robeson et al. and Mirkin et al. with ambient air as the interface for the growing three-dimensional objects.

BRIEF DESCRIPTION OF THE DRAWINGS

FIG. 7A and FIG. 7B illustrate an exemplary use of the apparatus of FIG. 2 according to embodiments of the present invention.

DETAILED DESCRIPTION OF ILLUSTRATIVE EMBODIMENTS

Figure 1:
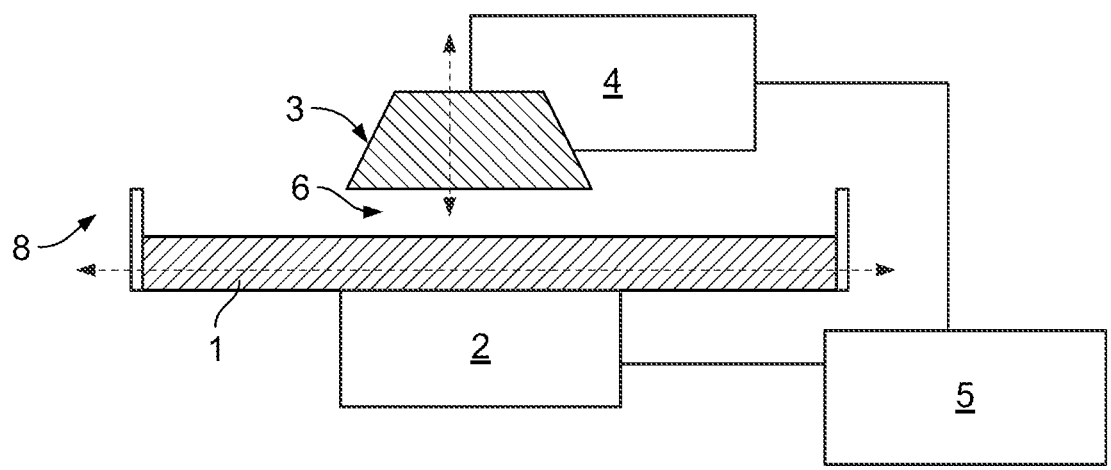
FIG. 1 illustrates an apparatus for additive manufacturing a three-dimensional object having a single applicator assembly according to embodiments of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout and different embodiments of like elements can be designated using a different number of superscript indicator apostrophes (e.g., 10', 10", 10'''). In the figures, the thickness of certain lines, layers, components, elements or features may be exaggerated for clarity. Where used, broken lines illustrate optional features or operations, unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

Any suitable polymerizable liquid that includes a component that is cured by actinic radiation or light, particularly UV light, may be used to carry out the present invention. In some embodiments, the polymerizable liquid may be a "dual cure" polymerizable liquid that additionally includes components that are cured by a different mechanism (heat, microwave irradiation, light at a different wavelength, etc.). Where a second cure is employed after a "green" part is initially fabricated, in some embodiments reaction products of the first cure may serve as reactants, or precursors, for the second cure.

Dual cure systems as described herein may include a first curable system (sometimes referred to as "Part A") that is curable by actinic radiation, typically light, and in some embodiments ultraviolet (UV) light. Any suitable polymerizable liquid can be used as the first component. The liquid (sometimes also referred to as "liquid resin," "ink," or simply "resin" herein) can include a monomer, particularly photo-polymerizable and/or free radical polymerizable monomers, and a suitable initiator such as a free radical initiator, and combinations thereof.

In some embodiments of the invention, the polymerizable liquid comprises a first light polymerizable component (Part A) and a second component that solidifies by another mechanism, or in a different manner from, the second component (sometimes referred to as "Part B" herein), typically by further reacting, polymerizing, or chain extending.

Part A chemistry. As noted above, in some embodiments of the present invention, a resin will have a first component, termed "Part A." Part A comprises or consists of a mix of monomers and/or pre-polymers that can be polymerized by exposure to actinic radiation or light. This resin can have a functionality of 2 or higher (though a resin with a functionality of 1 can also be used when the polymer does not dissolve in its monomer). A purpose of Part A is to "lock" the shape of the object being formed or create a scaffold for the one or more additional components (e.g., Part B). Importantly, Part A is present at or above the minimum quantity needed to maintain the shape of the object being formed after the initial solidification. In some embodiments, this amount corresponds to less than ten, twenty, or thirty percent by weight of the total resin (polymerizable liquid) composition. In some embodiments, Part A can react to form a cross-linked polymer network or a solid homopolymer.

An aspect of the solidification of Part A is that it provides a scaffold in which a second reactive resin component, termed "Part B," can solidify during a second step (which may occur concurrently with or following the solidification of Part A). This secondary reaction preferably occurs without significantly distorting the original shape defined during the solidification of Part A. Alternative approaches would lead to a distortion in the original shape in a desired manner.

Part B chemistry. Part B may comprise, consist of or consist essentially of a mix of monomers and/or pre-polymers that possess reactive end groups that participate in a second solidification reaction after the Part A solidification reaction. In some embodiments, Part B could be added simultaneously to Part A so it is present during the exposure to actinide radiation, or Part B could be infused into the object made during the 3D printing process in a subsequent step. Examples of methods used to solidify Part B include, but are not limited to, contacting the object or scaffold to heat, water or water vapor, light at a different wavelength than that at which Part A is cured, catalysts, (with or without additional heat), evaporation of a solvent from the polymerizable liquid (e.g., using heat, vacuum, or a combination thereof), microwave irradiation, etc., including combinations thereof.

Examples of dual cure systems that may be used in carrying out the present invention include, but are not limited to, those described in U.S. Pat. No. 9,205,601 to DeSimone et al., U.S. Pat. No. 9,453,142 to Rolland et al., and U.S. Patent Application Publication No. 2017/0066185 to Ermoshkin et al., the disclosures of each of which are incorporated herein by reference in their entirety.

Apparatus with a Single Applicator Assembly

Figure 8:
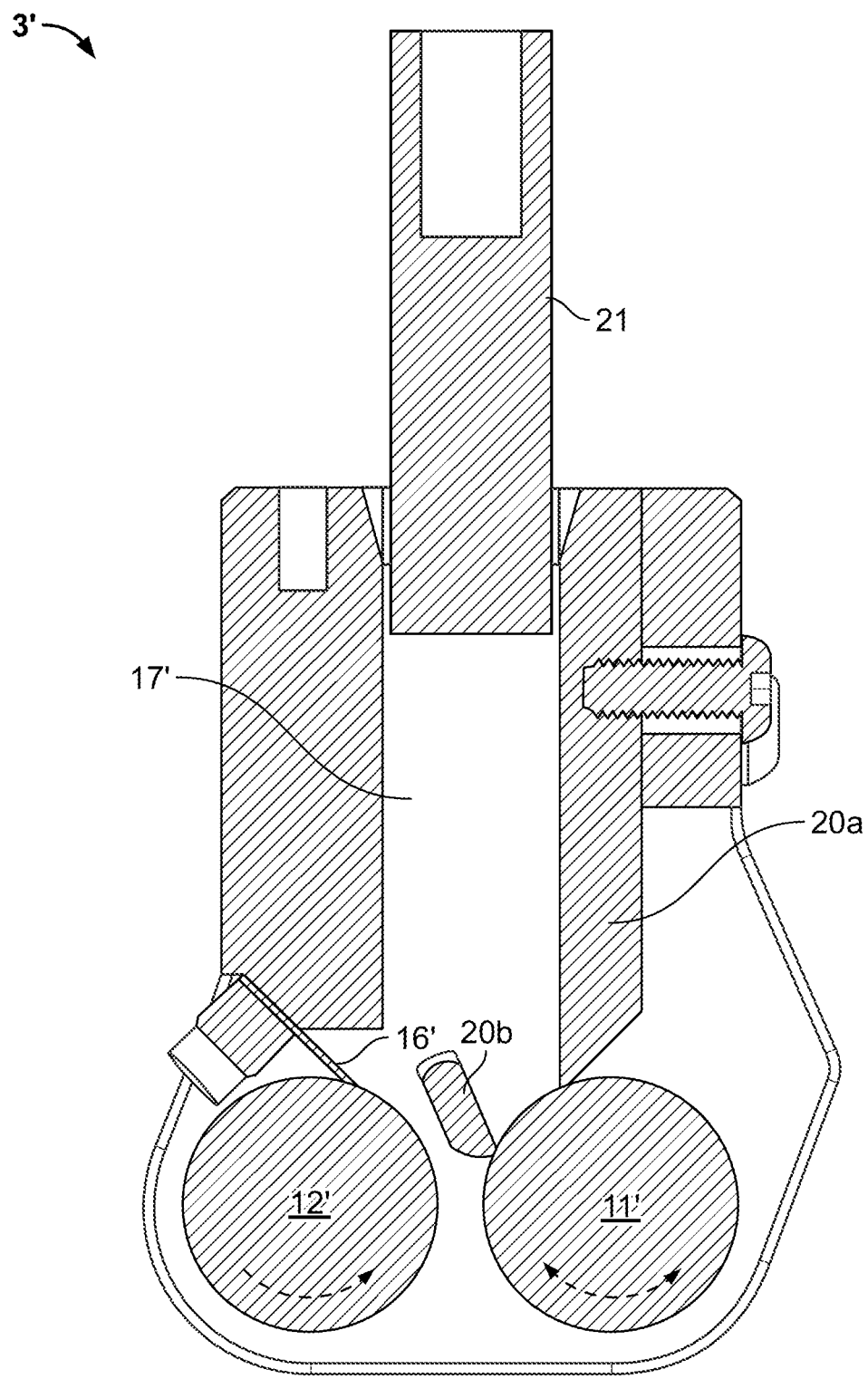
FIG. 8 illustrates an applicator assembly for additive manufacturing a three-dimensional object according to embodiments of the present invention.
Figure 9A:
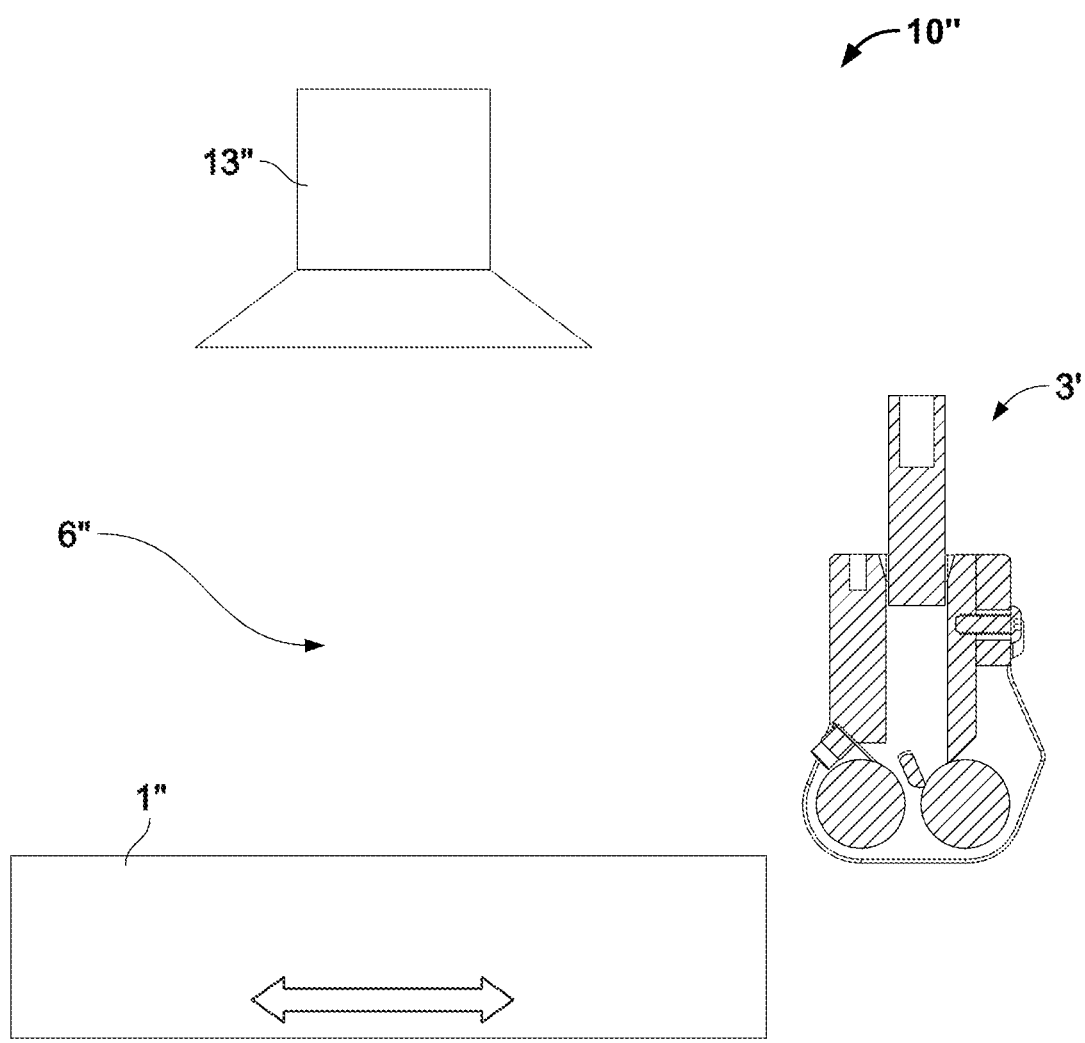
FIGS. 9A-9D illustrate an apparatus for additive manufacturing a three-dimensional object that includes the applicator assembly of FIG. 8 and an exemplary use thereof according to embodiments of the present invention.
Figure 9B:
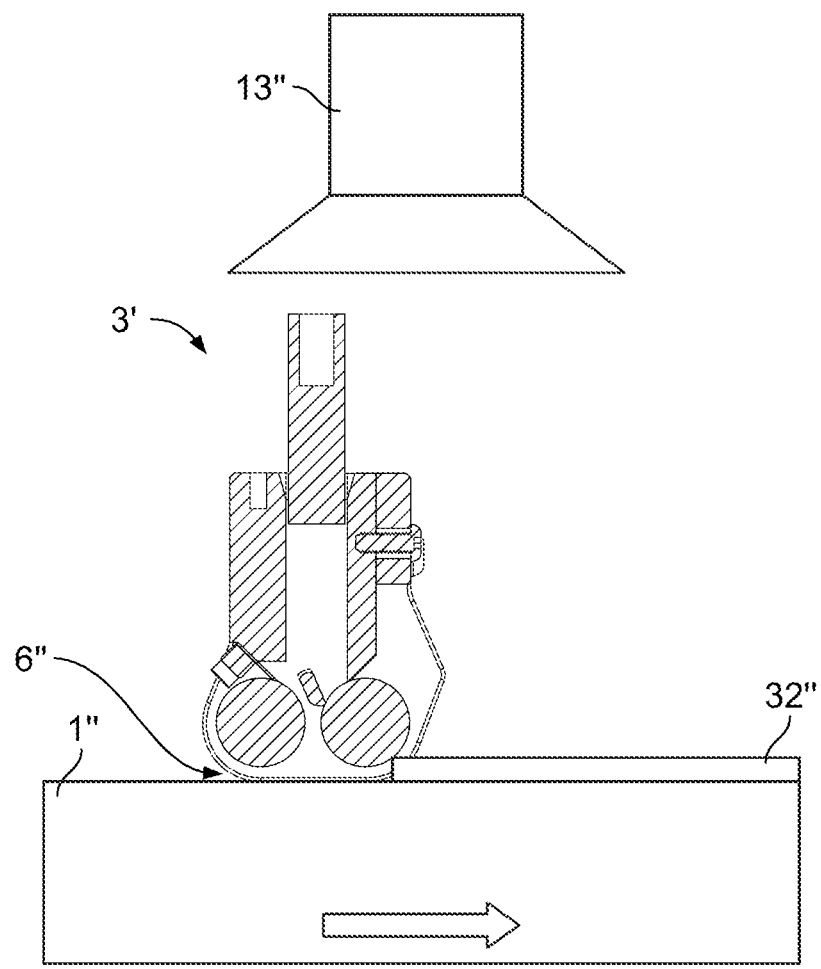
Figure 9C:
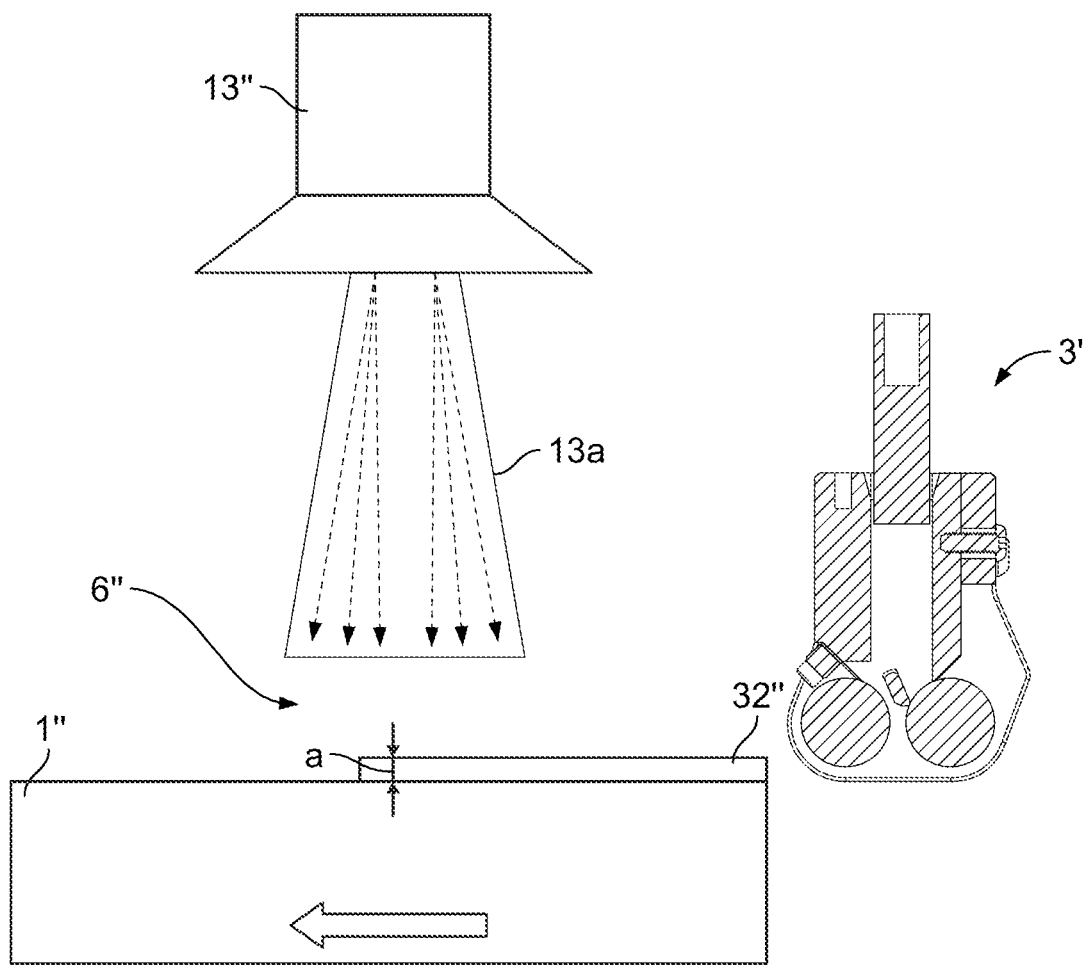
Figure 9D:
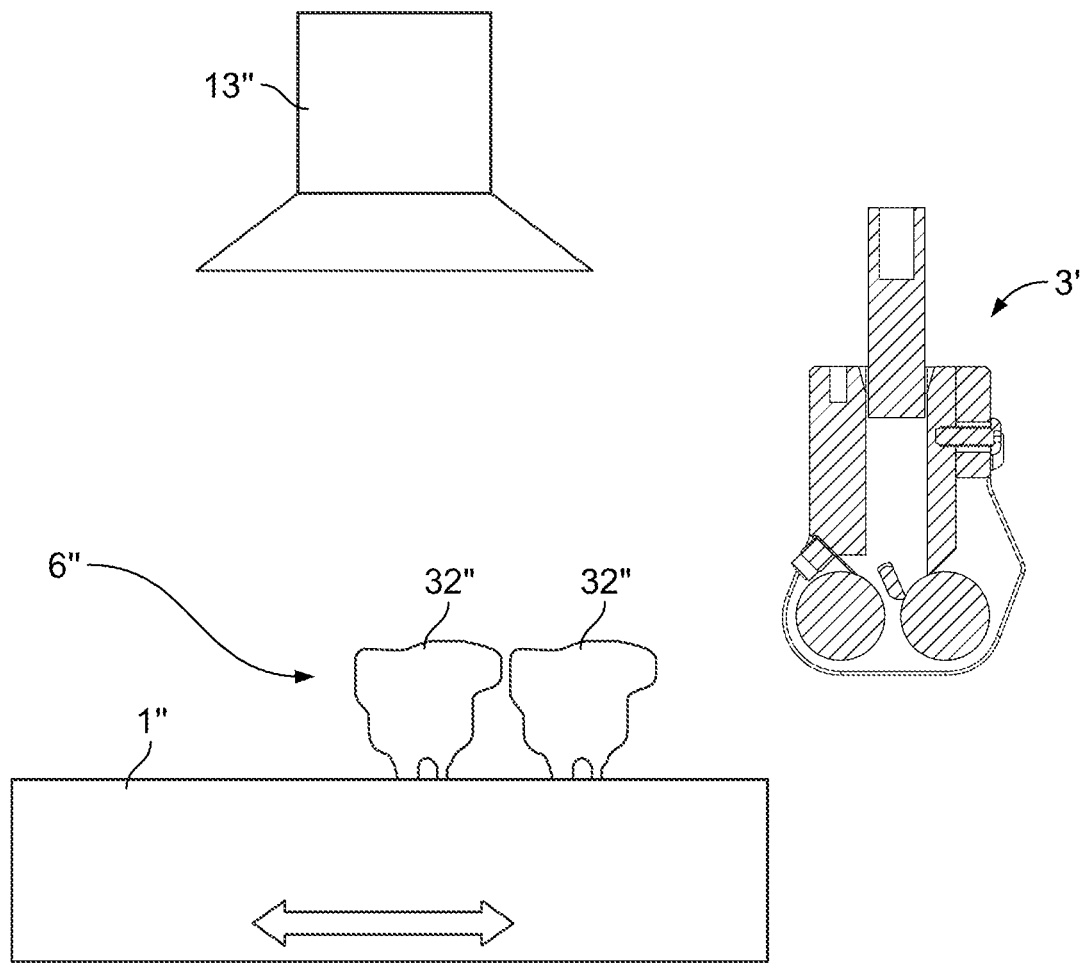

Referring now to the figures, an apparatus 10 useful for additively manufacturing a three-dimensional object 32 is illustrated in FIGS. 1-6 (see also FIGS. 8-9D). As shown in FIG. 1, in some embodiments, an apparatus 10 includes a carrier 1 and an applicator assembly 3. The carrier 1 and the applicator assembly 3 may be connected to a frame 8 with the frame 8 defining a build region 6 between the carrier 1 and the applicator assembly 3. The apparatus 10 may include a first drive assembly 4 interconnecting the applicator assembly 3 and the frame 8 through a controller 5. The apparatus 10 may include a second drive assembly 2 interconnecting the carrier 1 and the frame 8 through the controller 5.

Figure 2:
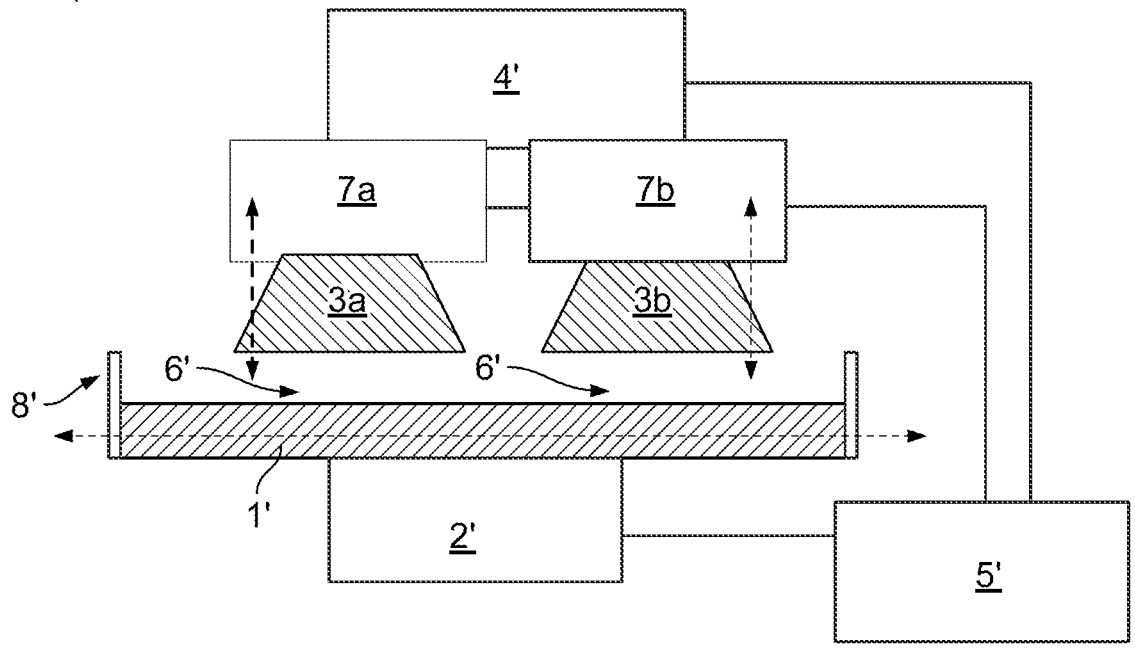
FIG. 2 illustrates an apparatus for additive manufacturing a three-dimensional object having a first and a second applicator assembly according to embodiments of the present invention.
Figure 3:
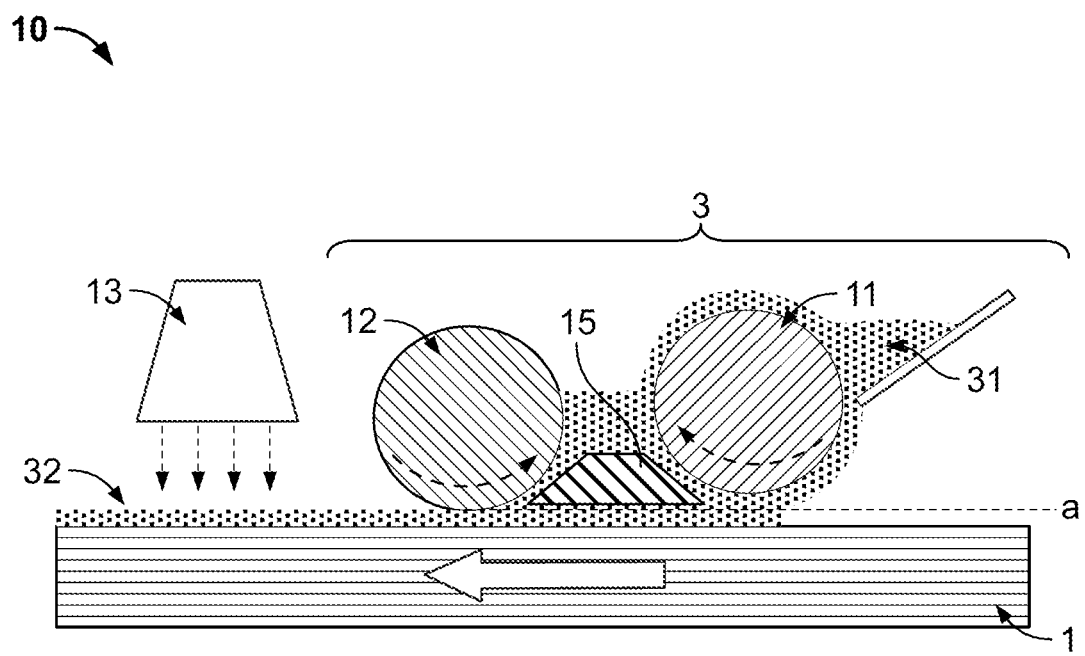
FIG. 3 illustrates an exemplary use of the apparatus of FIG. 1 according to embodiments of the present invention.

Referring to FIG. 2, and discussed in further detail below (see, e.g., FIGS. 7A and 7B), in some embodiments, an apparatus 10' may include a first and a second applicator assembly 3a, 3b. Each applicator assembly 3a, 3b may be connected to a respective subassembly lifter 7a, 7b. In some embodiments, the subassembly lifters 7a, 7b may each include a double-acting air cylinder. The subassembly lifters 7a, 7b are interconnected to a first drive assembly 4' with the applicator assemblies 3a, 3b through a controller 5'.

Similar to the apparatus 10 shown in FIG. 1, the apparatus 10' includes a carrier 1'. The carrier 1' and the applicator assemblies 3a, 3b may be connected to a frame 8' with the frame 8' defining a build region 6' between the carrier 1' and the applicator assemblies 3a, 3b. The apparatus 10' may include a second drive assembly 2' interconnecting the carrier 1' and the frame 8' through the controller 5'.

Referring now to FIGS. 3-6, the apparatus 10 includes a radiation source 13. In some embodiments, the radiation source 13 is a light source. The applicator assembly 3 (e.g., a printer head) comprises a polymerizable liquid (e.g., a resin 31) supply chamber 17, an application roller 11, and a metering roller 12. In some embodiments, the applicator assembly 3 further comprises a metering element 15 between the application roller 11 and the metering roller 12. For example, in some embodiments, the metering element 15 is a center bar located between the application roller 11 and the metering roller 12. In some embodiments, the metering element 15 is a cleaning (or doctoring) blade. In some embodiments, the radiation source 13 is connected to the frame 8. In some embodiments, the radiation source 13 may be included as part of the applicator assembly 3. As will be discussed in further detail below, the applicator assembly 3 is configured to deposit the polymerizable liquid (or resin 31) layer-by-layer at a controlled thickness (a) (i.e., height) within the build region 6 of the apparatus 10 to form a three-dimensional object 32.

Figure 6:
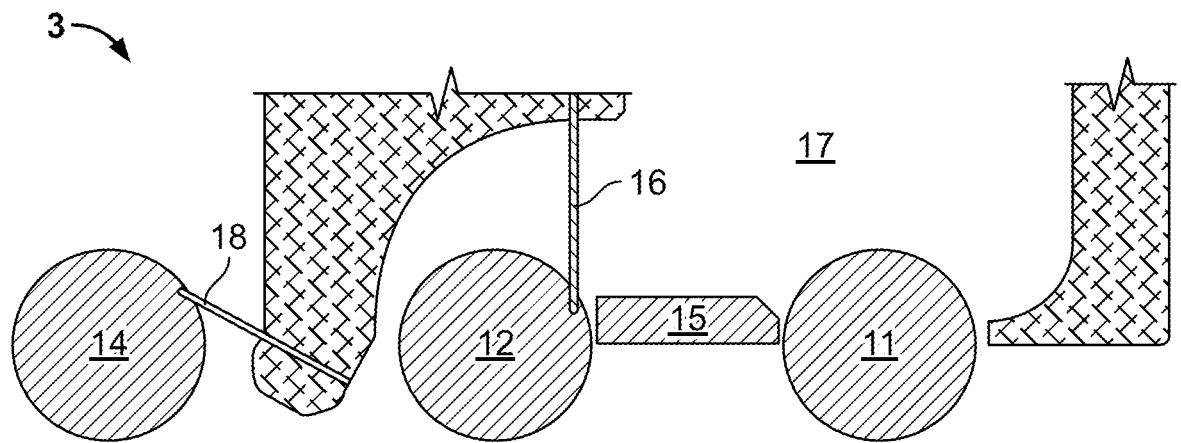
FIG. 6 is an enlarged view of the applicator assembly of the apparatus shown in FIG. 4 and FIG. 5.

As shown in FIG. 6, the supply chamber 17 is suspended over the application roller 11 and metering roller 12. It should be understood that any suitably sized supply chamber may be used. In some embodiments, the supply chamber 17 may have a height in the range of about 2 inches to about 4 inches. For example, in some embodiments, the supply chamber 17 has a height of about 2.5 inches.

The application roller 11 is configured to deposit the resin 31 forming the three-dimensional object 32. A thin layer of resin 31 is applied to the application roller 11 from the supply chamber 17. The thickness of the layer of resin 31 that is applied to the application roller 11 may vary depending on a number of different factors, such as, for example, dynamic viscosity, roller speed, roller diameter, surface finish. In some embodiments, the layer of resin 31 applied to the application roller 11 from the supply chamber 17 may have a thickness in the range of about 50 µm to about 200 µm. The resin 31 may have a high viscosity allowing the resin 31 to be "picked up" by the rotating application roller 11. The thickness of the layer of resin 31 applied to the application roller 11 from the supply chamber 17 may be controlled by the distance between the application roller 11 and the metering element 15 and/or the distance between the application roller 11 and a wall of the applicator assembly 3 (i.e., the thickness of the layer of resin 31 applied to the application roller 11 from the supply chamber 17 is about equal to the distance between the application roller 11 and the metering element 15 and/or the wall of the applicator assembly 3). In some embodiments, the metering element 15 may have a chamfer adjacent the application roller 11 to help with the flow of the resin 31 from the supply chamber 17 onto the application roller 11 (e.g., when the metering element 15 is a center bar). The layer of resin 31 picked up by the application roller 11 is thin enough such that it stably attaches (e.g., by surface friction) to the application roller 11 but is also able to be deposited on the object 32 being formed on the carrier 1 when it makes contact with the previous layer of resin 31 deposited onto the object 32.

In some embodiments, in addition to having a high viscosity, the resin 31 may also be shear thinning (i.e., the viscosity of the resin 31 decreases under shear strain). In some embodiments, the resin 31 may comprise fumed silica (e.g., AEROSIL®) and/or Nylon-6,6.

Figure 4:
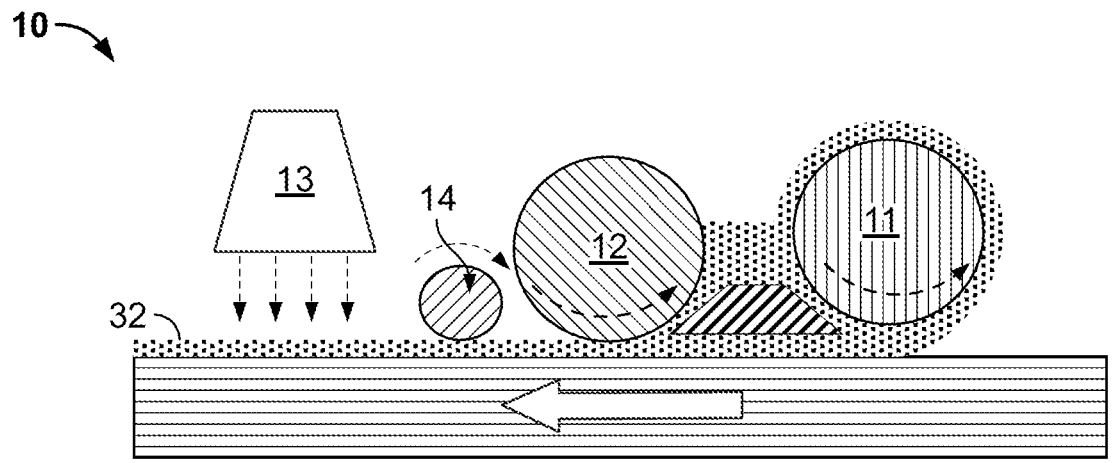
FIG. 4 illustrates an exemplary use of the apparatus of FIG. 1 according to embodiments of the present invention.

The application roller 11 may rotate in a clockwise direction (i.e., forward coating) (see, e.g., FIG. 3 and FIG. 5) or may rotate in a counter-clockwise direction (i.e., reverse coating) (see, e.g., FIG. 4). The application roller 11 may rotate with a tangential velocity in the range of about 600 inches/minute to about 700 inches/minute. In some embodiments, the application roller 11 rotates with a tangential velocity of about 645 inches/minute.

The metering roller 12 may be positioned a distance above the object 32 being formed which is equal to the thickness (a) of the current layer of resin 31 being deposited on the object 32. The metering roller 12 may rotate in a clockwise or counter-clockwise direction, but always rotates such that its tangential velocity where the metering roller 12 interfaces with the resin 31 is opposite the direction of motion of the carrier 1. The carrier 1 may move at a speed in the range of about 50 inches/minute to about 700 inches/minute. In some embodiments, the carrier 1 moves at a speed of about 600 inches/minute.

As shown in FIGS. 3-6, the metering roller 12 rotates in a counter-clockwise direction which is in the opposite direction of the motion of the carrier 1 (i.e., right to left when the apparatus 10 is used in the orientation as shown in the figures). In some embodiments, both the metering roller 12 and the application roller 11 rotate in a counter-clockwise direction (i.e., reverse coating) (see, e.g., FIG. 4). In some embodiments, the metering roller 12 rotates in a counter-clockwise direction and the application roller 12 rotates in a clockwise direction (i.e., forward coating) (see, e.g., FIG. 3 and FIG. 5).

Rotating the metering roller 12 in a counter-clockwise direction (i.e., the rotation of the metering roller 12 is counter to the motion of the carrier 1) may help to provide negative feedback on any errors or inaccuracies in the thickness (a) of the layer of resin 31 being deposited onto the object 32 by the application roller 11. For example, any resin 31 deposited by the application roller 11 that is higher than the thickness (a) for that layer (as determined by the distance of the metering roller 12 above the object 32) contacts the metering roller 12 and is carried up by the metering roller 12 back into the supply chamber 17.

As shown in FIG. 6, in some embodiments, the applicator assembly 3 may further comprise a blade 16. In some embodiments, the blade 16 is a spring steel blade. The blade 16 contacts (presses against) the metering roller 12 such that the blade 16 cleans the metering roller 12 prior to the metering roller 12 making contact with the layer of resin 31 being deposited on the object 32. Other methods of cleaning the metering roller 12 may be employed.

It may be desirable that the metering roller 12 is clean of resin 31 when contacting the layer of resin 31 deposited on the object 32. For example, if the metering roller 12 is carrying residual resin 31, the residual resin 31 may be deposited back on the "metered" layer of resin 31, thus disturbing the even layer of resin 31 deposited on the object 32. Cleaning the metering roller 12 can help ensure that the "metered" side (i.e., clean or flattened) of the layer of resin 31 interfaces with clean steel of the metering roller 12. The wetting properties of clean steel can help ensure that an even layer of resin 31 is being deposited on the object 32.

The metering roller 12 may rotate with a tangential velocity in the range of about 300 inches/minute to about 700 inches/minute. In some embodiments, the tangential velocity of the metering roller 12 is equal to the tangential velocity of the application roller 11. In some embodiments, the metering roller 12 rotates with a tangential velocity of about 645 inches/minute. In some embodiments, the application roller 11 and the metering roller 12 may have a tangential velocity that is about two times the velocity of the carrier 1. In some embodiments, the application roller 11 and the metering roller 12 are driven by the same drive motor. For example, in some embodiments, the application roller 11 and the metering roller 12 are chain driven by a 50 w brushless DC motor.

The placement of the application roller 11 with respect to the distance above the carrier 1 may vary when compared to the distance of the metering roller 12 above the carrier 1. In some embodiments, the application roller 11 may be placed in a range of about one layer of thickness (a) below the metering roller 12 to about one layer of thickness (a) above the metering roller 12.

Figure 5:
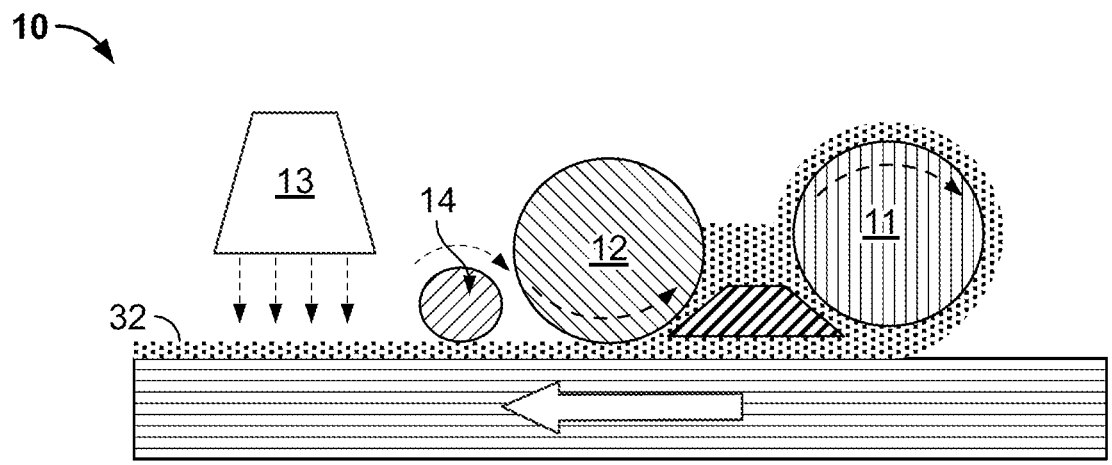
FIG. 5 illustrates an exemplary use of the apparatus of FIG. 1 according to embodiments of the present invention.

In some embodiments, the applicator assembly 3 may further comprise a post-metering roller 14 (see, e.g., FIGS. 4-6). The post-metering roller 14 is positioned after the metering roller 12 and before the radiation source 13. The post-metering roller 14 can help to reduce or eliminate any "peaks" (or bumps) in a deposited layer of resin 31 that may have resulted from the inertia of the resin 31 after contacting the metering roller 12. The post-metering roller 14 rotates in a clockwise direction (i.e., in a direction opposite to the rotation of the metering roller 12) and pushes "peaks" on the surface of the deposited resin 31 backwards off the object 32. The post-metering roller 14 may be positioned a distance above the object 32 slightly higher than the metering roller 12 (e.g., about 0.001 inches) such that the post-metering roller 14 does not disturb the deposited layer of the resin 31. In some embodiments, the post-metering roller 14 may be driven off of a metering shaft by a rubber drive wheel. In some embodiments, the post-metering roller 14 may rotate with a tangential velocity that is faster than the application roller 11 and/or the metering roller 12. For example, in some embodiments, the post-metering roller 14 may rotate with a tangential velocity in the range of about 600 inches/minute to about 1200 inches/minute. In some embodiments, the post-metering roller 14 rotates with a tangential velocity of about 1200 inches/minute. In some embodiments, post-metering roller 14 may have a tangential velocity that is about four times the velocity of the carrier 1. In some embodiments, the applicator assembly 3 may further comprise a second blade 18. In some embodiments, the second blade 18 is a plastic blade. Similar to the blade 16 that cleans the metering roller 11, the second blade 18 contacts (presses against) the post-metering roller 14 such that the blade 18 cleans the post-metering roller 14 prior to the post-metering roller 14 making contact with the layer of resin 31 being deposited on the object 32. The blade 18 cleans the post-metering roller 14 in order to keep resin 31 from collecting on the post-metering roller 14 and disturbing the layer of resin 31 being deposited on the object 32.

It should be understood that any suitably sized roller may be used. In some embodiments, each roller 11, 12, 14 of the present invention is formed of steel and may have a diameter in the range of about 0.25 inches to about 1 inch and may have a length in the range of about 2 inches to about 12 inches. An example of suitable steel for the rollers includes, but is not limited to, Rockwell C60, 1566 carbon steel (surface hardened). In some embodiments, each roller 11, 12, 14 has a diameter of about 0.5 inches. In some embodiments, each roller 11, 12, 14 has a length of about 3 inches. The axis of each roller 11, 12, 14 may be spaced apart by a distance of about 0.5 inches to about 1.5 inches. In some embodiments, the axis of each roller 11, 12, 14 is spaced apart by a distance of about 1 inch.

In operation, a layer of resin 31 is "picked up" from the supply chamber 17 by the application roller 11 and deposited on the carrier 1 (or a previously deposited layer of resin 31) based on information received from the controller 5. The carrier 1 moves the deposited layer of resin 31 under the metering roller 11 which is set at a pre-determined height above the carrier 1 (and equals the desired thickness (a) of the layer of resin 31 being deposited). The metering roller 11 removes any excess resin 31 that is above the pre-determined height, thereby creating a deposited layer of resin 31 with a uniform thickness (a). Optionally, a blade 16 cleans the excess resin 31 from the metering roller 11 ensuring that clean steel of the metering roller 11 contacts the deposited layer of resin 31. Optionally, the carrier 1 next moves the deposited layer of resin 31 under a post-metering roller 14. The post-metering roller 14 pushes backwards any "peaks" (or bumps) that may have formed in the deposited layer of resin 31. The deposited layer of resin 31 is then cured (or polymerized) by a radiation source 13. The radiation source 13 is turned on and off as the deposited layer of resin 31 passes under the radiation source 13 based on information received from the controller 5, curing only the section(s) of the layer of resin 31 that will form part of the three-dimensional object 32. This process is repeated until a three-dimensional object 32 is formed. In some embodiments, the apparatus 10 may apply and cure a layer of resin 31 at a rate in a range of about 50 inches/minute to about 600 inches/minute.

Apparatus with Multiple Applicator Assemblies

Referring now to FIGS. 7A and 7B, an apparatus 10' useful for additively manufacturing a three-dimensional object is illustrated.

As shown in FIGS. 7A and 7B, and as mentioned above, in some embodiments, the apparatus 10' includes a first applicator assembly 3a and second applicator assembly 3b. The apparatus 10' further comprises at least one radiation source 13' located between the two applicator assemblies 3a, 3b. Similar to the single applicator assembly 3 described above, each applicator assembly 3a, 3b comprises a polymerizable liquid (e.g., a resin 31') supply chamber 17 (see, e.g., FIG. 6), an application roller 11a, 11b, and a metering roller 12a, 12b. In some embodiments, each applicator assembly 3a, 3b may comprise a metering element 15a, 15b located between the application roller 11a, 11b and the metering roller 12a, 12b. In some embodiments, each applicator assembly 3 may further comprise a post-metering roller 14a, 14b.

Properties and/or features of the apparatus 10', such as, for example, roller positions, roller dimensions, and tangential velocity, may be as described above in reference to FIGS. 1-6 and duplicate discussion thereof may be omitted herein for the purposes of discussing FIGS. 7A-7B. It is noted that exemplary embodiments of the apparatus 10' and applicator assemblies 3a, 3b described herein can be used as described above with respect to the apparatus 10. Also one or more features from one or more embodiments can be combined or used in other embodiments.

Referring to FIG. 7A, similar to the apparatus 10, the application roller 11b of one of the applicator assemblies 3b of apparatus 10' (i.e., the active applicator assembly) "picks up" a layer of resin 31' from its supply chamber 17 and deposits the resin 31' on the carrier 1' (or previous layer of deposited resin 31'). As shown in FIG. 7A, the application roller 11b may rotate in a counter-clockwise direction (i.e., reverse coating). However, like discussed above, the application roller 11b could also rotate in a clockwise direction (i.e., forward coating).

The carrier 1' of the apparatus 10' moves the deposited layer of resin 31' under the metering roller 12b (i.e., right to left when the apparatus 10' is used in the orientation shown in the figures) which is set at a pre-determined height above the carrier 1' (i.e., the desired thickness (a) of the layer of resin 31' being deposited). The metering roller 12b removes any excess resin 31', thereby creating a deposited layer of resin 31' with a uniform thickness (a). Optionally, the carrier 1' next moves the deposited layer of resin 31' under a post-metering roller 14b. The post-metering roller 14b pushes backwards any "peaks" (or bumps) that may have formed in the deposited layer of resin 31'. The deposited layer of resin 31 is then cured (or polymerized) by the radiation source 13 in a similar manner as described above.

Note that as the applicator assembly 3b is depositing a layer of resin 31', the other applicator assembly 3a (i.e., the inactive applicator assembly) is lifted a distance (r) above the carrier 1' by the subassembly lifters 7a discussed above (see, e.g., FIG. 2). This helps to prevent the inactive applicator assembly (i.e., applicator assembly 3a in FIG. 7A) from depositing or smearing resin 31' on the object 32' when the inactive applicator assembly 3a is not in use.

Referring now to FIG. 7B, after applicator assembly 3b has deposited a layer of resin 31', the applicator assembly 3b is lifted a distance (r) above the carrier 1' becoming the inactive applicator assembly and the other applicator assembly 3a is pushed down to a pre-determined height above the previously deposited layer of resin 31' on top of the object 32' (which equals the desired thickness (b) of the next layer of resin 31' to be deposited on top of the object 32' being formed). The same process is repeated for applying and curing the next deposited layer of resin 31'. As shown in FIG. 7B, note that the application roller 11a rotates in a clockwise direction for reverse coating because the carrier 1' is moving in the opposite direction (i.e., left to right when the apparatus 10' is used in the orientation shown in the figures). For forward coating, the application roller 11a would rotate in a counter-clockwise direction.

The carrier 1' moves back and forth as the applicator assemblies 3a, 3b are raised and lowered (i.e., moving from active to inactive and from inactive to active) with each active applicator assembly 3a, 3b depositing a layer of resin 31' until a three-dimensional object 32' is formed.

"Mini" Single Applicator Assembly

FIG. 8 illustrates an alternative "mini" applicator assembly 3' useful for additively manufacturing a three-dimensional object is illustrated. FIGS. 9A-9D illustrate an apparatus 10" useful for additively manufacturing a three-dimensional object that utilizes the "mini" applicator assembly 3' shown in FIG. 8.

Properties and/or features of the applicator assembly 3' and/or apparatus 10" may be as described above in reference to FIGS. 1-7B and duplicate discussion thereof may be omitted herein for the purposes of discussing FIGS. 8-9D. It is noted that exemplary embodiments of the apparatus 10" and applicator assembly 3' described herein can be used as described above with respect to the apparatus 10, 10' and/or can be substituted for applicator assemblies 3, 3a, 3b. Also one or more features from one or more embodiments can be combined or used in other embodiments.

Apparatus 10" borrows from the core concepts discussed above with respect to the single applicator assembly, but is optimized for a different use. Apparatus 10, 10' of the present invention discussed above are designed for generalized manufacturing by targeting speed and allows for more options of usable resins 31, 31'. The "mini" applicator assembly 3', on the other hand, is targeted for use with a specific family of expensive resins 31" that can only be sourced in small quantities, such as, for example, G-aenial™ Universal Flo and Filtek™ Ultimate Flowable, which are types of dental resins. For this reason, the applicator assembly 3' of the present invention can operate with as little as 2 mL of resin 31".

As shown in FIG. 8 and FIGS. 9A-9D, the apparatus 10" and applicator assembly 3' share much of the same overall architecture with apparatus 10 and applicator assembly 3 discussed above. In some embodiments, the apparatus 10" includes a carrier 1" and an applicator assembly 3'. The carrier 1" and the applicator assembly 3' may be connected to a frame 8 with the frame 8 defining a build region 6" between the carrier 1" and the applicator assembly 3'. The apparatus 10" may include a first drive assembly 4 interconnecting the applicator assembly 3' and the frame 8 through the controller 5. The apparatus 10" may include a second drive assembly 2 interconnecting the carrier 1" and the frame 8 through the controller 5. The apparatus 10" includes a radiation source 13". In some embodiments, the radiation source 13" is a light source.

The applicator assembly 3' comprises a polymerizable liquid (e.g., a resin 31") supply chamber 17', an application roller 11', and a metering roller 12'. In some embodiments, the applicator assembly 3' comprises a plunger 21 extending into the top of the supply chamber 17'. The plunger 21 is configured to help push the resin 31" from the supply chamber 17' onto the application roller 11'. In some embodiments, the applicator assembly 3' further comprises two metering elements 20a, 20b. In some embodiments, the metering elements 20a, 20b are cleaning (or doctoring) blades. In some embodiments, the radiation source 13" is connected to the frame 8 in a fixed position above the carrier 1". In some embodiments, the carrier 1" of apparatus 10" may be smaller than the projected area 13a of the light source 13". Similar to the applicator assemblies 3, 3a, 3b discussed above, the applicator assembly 3' is configured to deposit the polymerizable liquid (or resin 31") layer-by-layer at a controlled thickness (a) (i.e., height) within the build region 6" of the apparatus 10" to form a three-dimensional object 32". In some embodiments, the three-dimensional object 32" is a dental prosthetics (see, e.g., FIG. 9D). For example, in some embodiments, the three-dimensional object 32" may be dental implants, dental bridges, or dental crowns.

The apparatus 10" may comprise two linear actuators (not shown) that move the carrier (or build platform) 1" side-to-side beneath, and across the applicator assembly 3' respectively. Minimizing resin requirements is achieved by limiting the surface area in the applicator assembly 3' that is exposed to resin 31". In this case, that means using a single applicator 3' in place of the dual-head design (see, e.g., FIGS. 7A-7B).

In order to support overhangs in both directions, to form the three-dimensional object 32", the resin 31" must be deposited from both directions. The apparatus 10" of the present invention achieves this by forming a single deposited layer of resin 31" in two passes of the applicator assembly 3' over the three dimensional object 32" within the build region 6". In operation, a layer of resin 31" is "picked up" from the supply chamber 17' by the application roller 11' and deposited on the carrier 1" (or a previously deposited layer of resin 31") based on information received from the controller 5. In the first pass (FIG. 9B), the application roller 11' rotates clockwise while the applicator assembly 3' moves to the left across the object 32" (i.e., the carrier 1" moving to the right when the apparatus 10" is used in the orientation shown in the figures), resulting in reverse coating. In the second pass of the layer-forming operation (FIG. 9C), the application roller 11' rotates counterclockwise while the applicator assembly 3' moves to the right across the object 32" (i.e., the carrier 1" moving to the left), again reverse coating. During the first pass, there should be no resin 31" in contact with the metering roller 12', since it crosses the object 32" before the application roller 11' makes contact. During the second pass, the metering roller 12' removes any excess resin 31" deposited by the application roller 11' in both passes. During the second pass, the metering roller 12' also ensures that the deposited layer of resin 31" is the desired thickness (a). The deposited layer of resin 31" is then cured (or polymerized) by the radiation source 13". The radiation source 13" is turned on and off as the deposited layer of resin 31" passes under the radiation source 13" based on information received from the controller 5, curing only the section(s) of the deposited layer of resin 31" that will form part of the three-dimensional object 32". This process is repeated until a three-dimensional object 32" (e.g., dental crown) is formed (see, e.g., FIG. 9D).

Figure 10:
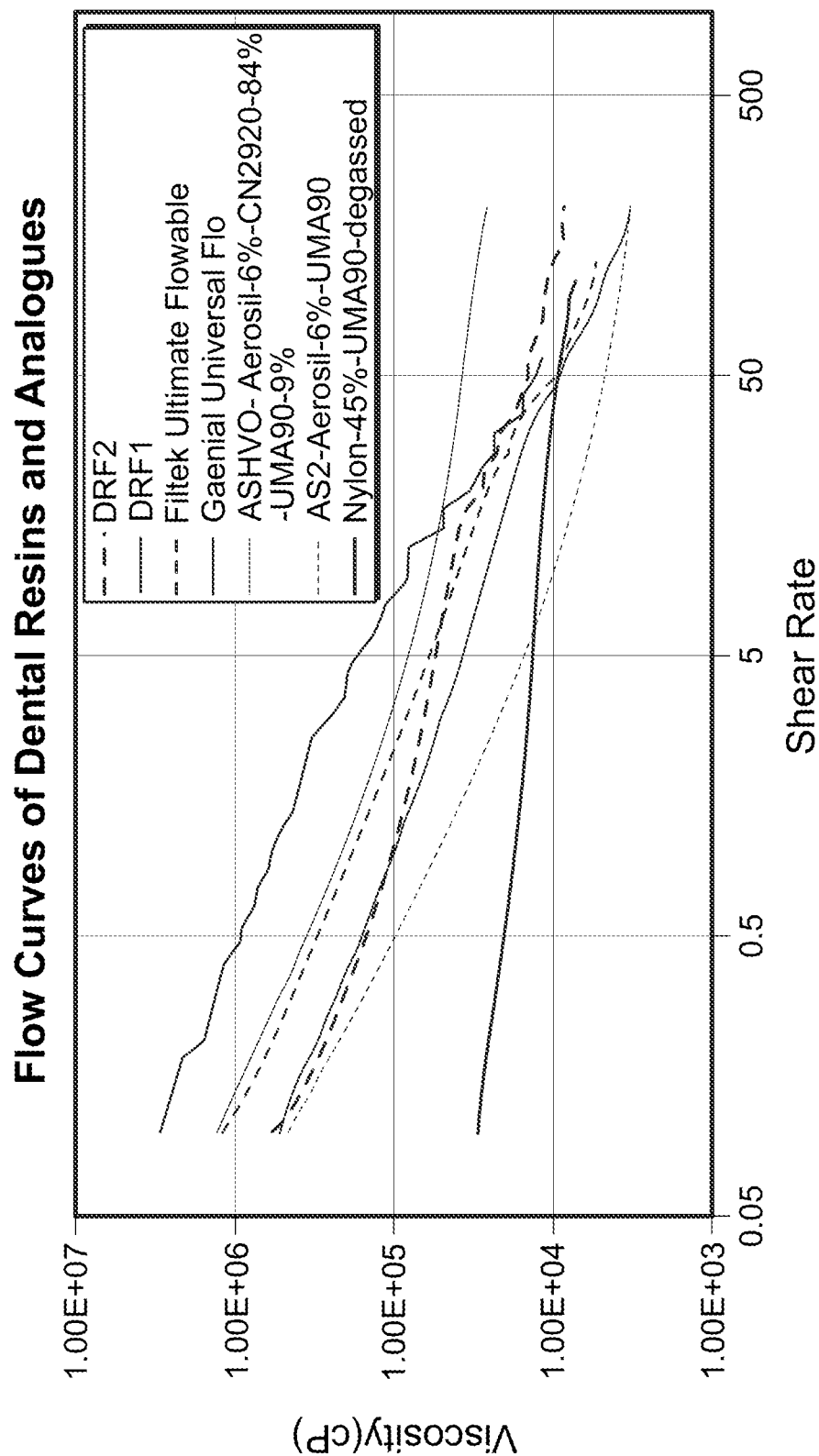
FIG. 10 is a graph illustrating the flow properties of exemplary resins that may be used with the applicator assembly of FIG. 8.

In some embodiments, example production settings may comprise setting both metering elements 20a, 20b about 0.002" from the application roller 11'. In the initial pass, the application roller 11' may rotate at about 96 RPM. On the return pass, the application roller 11' may rotate at about 49.2 RPM while the metering roller 12' may rotate at about 37.2 RPM. The applicator assembly 3' may move at a constant 50 mm/sec over the three-dimensional object 32" during both passes. Each layer may be about 20 μm in thickness (a) which may improve overhang angles and help to reduce cure times. These exemplary production settings may be used, such as, when using the applicator assembly 3' with a dental resin 31" (see, e.g., FIG. 10). Note that the production settings may be adjusted accordingly based on flow properties of the resin 31" being used to form the three-dimensional object 32".

In some embodiments, the applicator assembly 3' may further comprise a blade 16'. In some embodiments, the blade 16' is a spring steel blade. The blade 16' contacts (presses against) the metering roller 12' such that the blade 16' cleans the metering roller 12' prior to the metering roller 12' making contact with the layer of resin 31" being deposited on the object 32" during the second pass. Other methods of cleaning the metering roller 12' may be employed.

It is worth noting that, unlike the applicator assembly 3 discussed above; the applicator assembly 3' of the present invention may not include a post-metering roller 14. Minimizing the amount of excess resin 31" deposited on the walls of the three-dimensional object 32, 32', 32" being formed can mitigate or eliminate crushing defects. This may be achieved by reducing the rotational speed of the application roller 11'.

In some embodiments, both the application roller 11' and the metering roller 12' may be formed from 440C stainless steel that is case hardened to Rockwell C50. In some embodiments, the applicator assembly 3' may be formed from 6061 aluminum. In some embodiments, metering element 20b may be formed from 316 stainless steel. Standard sealed bearings may be used to mount the rollers 11', 12'. In some embodiments, an additional ring seal is cut from Teflon foam and rides between the side face of the rollers 11', 12' and the wall of the applicator assembly 3' to help prevent resin 31" from reaching the bearings. The application roller 11' and the metering roller 12' may be independently driven by two brushed DC motors.

In some embodiments, the first and/or second drive assemblies may be consolidated together as an XYZ drive, or some may be existing drive components of a CNC machine, to which an "applicator assembly" comprised of the supply chamber(s), rollers, blades, optionally additional drive components, light source, or at least rollers, all on a corresponding mounting frame, may be mounted or retrofitted. Examples of suitable CNC machines include, but are not limited to, the HAAS VF-2, VF-4, and VF-12/40 vertical CNC machines, and the HAAS EC-400 and EC-400 horizontal CNC machines, available from Haas Automation, Inc., 2800 Sturgis Road, Oxnard, Calif., 93030 U.S.A.

Stability of the additively manufacturing process (e.g., printing) and quality of the printed three-dimensional object 32, 32', 32" may depend on the timing and parameters of the applicator assemblies. Horizontal positioning of the build region, vertical positioning of the applicator assemblies, motor speeds and light projection (e.g., from the radiation source) may be controlled with millisecond accuracy at any moment of time. This control is achieved by a set of microcontrollers, which receive corresponding commands from a central computer unit (not shown). Communication between the computer unit and the microcontrollers is done via the standard CAN bus. Alternatively, this communication can be implemented via a serial line, such as RS232 or USB.

The algorithm of the manufacturing (e.g., print) process (i.e., the sequence and timing of the actuation commands) is programmed with a script written with the Lua programming language. This scripting approach allows tuning many parameters of the printing process in software. The manufacturing parameters may be provided in a three-dimensional printable file format file (e.g., STL format file or 3 MF format file).

In the printing process, the position of the building region ($X_{ba}$) and projection of the currently deposited layer ($X_{cs}$) may be synchronized. The difference ($X_{ba}$-$X_{cs}$) controls crispness and surface quality of the printed three-dimensional object. For best visual and tactile appearance this difference should not exceed about 10 μm.

When using a commercially available CNC machine to actuate the build platform, its delayed response to the input command may become a dominant source of positional inaccuracy and large ($X_b$-$X_{cs}$). In order to negate this effect, a dedicated compensation motor and a microcontroller should be introduced for fine control of the projector position. The compensation motor is capable of moving the entire optical engine along the build platform travel direction. The compensation microcontroller continuously reads ($X_{ba}$) from the high accuracy optical rotational encoder and compares it to ($X_{cs}$) as computed from the index of the video frame being displayed. The compensation microcontroller then computes the travel of the compensation motor, which is used to offset the measured difference ($X_{ba}$-$X_{cs}$).

An alternative method for position synchronization is electronic delay of the video stream. This method utilizes special electronic circuitry, featuring video decoder, encoder, and high-speed memory buffer. When using a dedicated motorized stage to actuate the build platform, ($X_{ba}$-$X_{cs}$) results primarily from mechanical imperfections of the stage and normally does not exceed 10 μm. However, it can be further reduced by purely electronical means, e.g., delaying video frame projection by about 0 milliseconds to about 1 millisecond.

In some embodiments, the applicator assemblies and build region are actuated by a HAAS VF-4 CNC. Commands to move are sent as G-Code via a serial connection. The measured delay to the actuation commands for this CNC is about 9 milliseconds to about 12 milliseconds. The compensation motor is capable to adjust the projector position by ±3 millimeters. The resulting imperfection in resin layer alignment, as discovered by microscope studies, is estimated to be about 10 μm to about 20 μm.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An apparatus for additively manufacturing a three-dimensional object, comprising:
   a radiation source;
   a carrier on which the three-dimensional object is made;
   an applicator assembly configured to apply a polymerizable liquid, said applicator assembly comprising:
      a polymerizable liquid supply chamber;
      an application roller;
      a metering roller; and
      a post-metering roller;
   a frame, with said applicator assembly and said radiation source connected to said frame, and with said frame defining a build region between said applicator assembly and said carrier;
   a first drive assembly interconnecting said applicator assembly and said frame; and
   a second drive assembly interconnecting said carrier and said frame,
   wherein the polymerizable liquid is a highly viscous resin.

2. The apparatus of claim 1, wherein said applicator assembly further comprises a metering element between the application roller and the metering roller.

3. The apparatus of claim 2, wherein said metering element is a cleaning blade.

4. The apparatus of claim 1, wherein said application roller and said metering roller both rotate in a counter-clockwise direction.

5. The apparatus of claim 1, wherein said application roller rotates in a clockwise direction and said metering roller rotates in a counter-clockwise direction.

6. The apparatus of claim 1, wherein said post-metering roller rotates in a clockwise direction.

7. The apparatus of claim 1, wherein said applicator assembly further comprises a first blade pressed against the metering roller and a second blade on top of said post-metering roller.

8. The apparatus of claim 1, wherein the highly viscous resin is a dental resin.

9. The apparatus of claim 1, wherein the highly viscous resin comprises fumed silica.

10. An apparatus for additively manufacturing a three-dimensional object, comprising:
    a radiation source;
    a carrier on which the three-dimensional object is made;
    a first and a second applicator assembly configured to apply a polymerizable liquid, each applicator assembly comprising:
       a polymerizable liquid supply chamber;
       an application roller;
       a metering roller; and
       a post-metering roller;
    a frame, with said first and applicator assemblies and said radiation source connected to said frame, and with said frame defining a build region between said first and second applicator assembly and said carrier;
    a first drive assembly interconnecting said first and second applicator assemblies and said frame;
    a second drive assembly interconnecting said carrier and said frame; and
    a plurality of air cylinders configured to raise and lower each of said first and second applicator assemblies such that when one applicator assembly is lowered to apply the polymerizable liquid, the other applicator assembly is raised.

11. The apparatus of claim 10, wherein said first and second applicator assemblies further comprise a metering element between the application roller and the metering roller.

12. The apparatus of claim 10, wherein said application roller and said metering roller of each of said first and second applicator assemblies both rotate in a counter-clockwise direction.

13. The apparatus of claim 10, wherein said application roller of each of said first and second applicator assemblies rotates in a clockwise direction and said metering roller of each of said first and second applicator assemblies rotates in a counter-clockwise direction.

14. The apparatus of claim 10, wherein said post-metering roller of each of said first and second applicator assemblies rotates in a clockwise direction.

15. An apparatus for additively manufacturing a three-dimensional object, comprising:
    a radiation source;
    a carrier on which the three-dimensional object is made;
    an applicator assembly configured to apply a polymerizable liquid, said applicator assembly comprising:
       a polymerizable liquid supply chamber;
       an application roller;
       a metering roller;
       two metering elements adjacent to said application roller; and
       a plunger extending into a top section of said supply chamber, said plunger configured to push the polymerizable liquid from said supply chamber onto said application roller;
    a frame, with said applicator assembly and said radiation source connected to said frame, and with said frame defining a build region between said applicator assembly and said carrier;
    a first drive assembly interconnecting said applicator assembly and said frame; and
    a second drive assembly interconnecting said carrier and said frame.

16. The apparatus of claim 15, wherein said application roller is configured to rotate in a clockwise direction during a first pass of the applicator assembly over the three dimensional object and configured to rotate in a counter-clockwise direction during a second pass of the applicator assembly over the three-dimensional object to form a single deposited layer of said dental resin on the three-dimensional object.

17. The apparatus of claim 15, where said two metering elements are cleaning blades.

18. The apparatus of claim 15, wherein the polymerizable liquid is a dental resin.

19. The apparatus of claim 15, wherein the three-dimensional object is a dental prosthetic.

20. The apparatus of claim 19, wherein the dental prosthetic is a dental implant, a dental bridge, or a dental crown.

* * * * *